(12) United States Patent
Ernst et al.

(10) Patent No.: US 9,795,898 B2
(45) Date of Patent: Oct. 24, 2017

(54) CYCLONIC SEPARATOR SYSTEM

(71) Applicant: JCI CYCLONICS LTD., Calgary (CA)

(72) Inventors: Kenneth Alfred Ernst, Leduc (CA); Matthew James Green, Chestermere (CA); Morley Everett Kocken, West Kelowna (CA); Brendan Alexander Connolly, Langdon (CA)

(73) Assignee: JCI Cyclonics Ltd., Calgary, AB (CA)

( * ) Notice: Subject to any disclaimer, the term of this patent is extended or adjusted under 35 U.S.C. 154(b) by 76 days.

(21) Appl. No.: 14/674,964

(22) Filed: Mar. 31, 2015

(65) Prior Publication Data

US 2016/0288019 A1    Oct. 6, 2016

(51) Int. Cl.

| | |
|---|---|
| B01D 19/00 | (2006.01) |
| B01D 45/12 | (2006.01) |
| B01D 45/16 | (2006.01) |
| B04C 3/04 | (2006.01) |
| B04C 5/04 | (2006.01) |
| B04C 5/14 | (2006.01) |
| B04C 5/13 | (2006.01) |
| B04C 5/28 | (2006.01) |

(52) U.S. Cl.
CPC ..... *B01D 19/0026* (2013.01); *B01D 19/0057* (2013.01); *B04C 5/04* (2013.01); *B04C 5/13* (2013.01); *B04C 5/14* (2013.01); *B04C 5/28* (2013.01); *B04C 3/04* (2013.01)

(58) Field of Classification Search
CPC  B01D 19/0026; B01D 19/0057; B01D 45/12; B01D 45/46; B01D 45/16; B04C 3/04; B04C 3/06; B04C 5/04; B04C 5/14; B04C 5/28

USPC ......................................................... 55/459.2
See application file for complete search history.

(56) References Cited

U.S. PATENT DOCUMENTS

| | | |
|---|---|---|
| 1,239,456 A | 9/1917 | Brantingham et al. |
| 1,708,697 A | 4/1929 | Jensen |
| 2,201,301 A | 5/1940 | Richardson et al. |
| 2,205,966 A | 6/1940 | Van Tongeren |
| 2,816,490 A * | 12/1957 | Boadway ........... B01D 19/0057 209/725 |
| 3,217,469 A | 11/1965 | Eckert |
| 3,543,931 A | 12/1970 | Rastatter |
| 4,702,846 A | 10/1987 | Ryynanen |
| 4,842,145 A * | 6/1989 | Boadway .................. B04C 5/12 209/719 |

(Continued)

FOREIGN PATENT DOCUMENTS

| | | |
|---|---|---|
| EP | 1080298 B1 | 7/2003 |
| FR | 880715 A | 4/1943 |

*Primary Examiner* — Jason M Greene

(57) ABSTRACT

A cyclonic separator is provided, comprising at least one cyclonic chamber in the form of a cylindrical tube, having an upper inlet end and a lower liquid outlet end, at least one involute chamber located adjacent to and in fluid communication with the upper end of each of the at least one cyclonic chambers. The involute chamber comprises an involute inlet and a gas outlet proximal an upper end of the involute chamber. An inlet manifold is in fluid communication with said at least one involute chamber via the involute inlet. Said involute inlet of said involute chamber is laterally separated from said gas outlet. A method is further provided for separation of a mixed heavy phase/light phase process stream.

20 Claims, 7 Drawing Sheets

(56) References Cited

U.S. PATENT DOCUMENTS

| | | | |
|---|---|---|---|
| 5,009,785 A | 4/1991 | Webb | |
| 5,013,342 A | 5/1991 | Leussler et al. | |
| 5,221,301 A | 6/1993 | Giuricich | |
| 5,788,848 A * | 8/1998 | Blanche | B01D 45/12 210/162 |
| 6,279,556 B1 | 8/2001 | Busen et al. | |
| 6,398,973 B1 | 6/2002 | Saunders et al. | |
| 6,576,029 B2 | 6/2003 | West | |
| 6,673,135 B2 | 1/2004 | West | |
| 7,001,448 B1 | 2/2006 | West | |
| 7,931,719 B2 | 4/2011 | Sams et al. | |
| 2002/0007736 A1* | 1/2002 | Hearn | B01D 19/0057 96/209 |
| 2003/0000186 A1* | 1/2003 | West | B04C 3/06 55/459.1 |
| 2010/0064893 A1* | 3/2010 | Hopper | B04C 5/04 210/787 |
| 2011/0245750 A1* | 10/2011 | Lynch | B01D 19/0057 604/5.01 |
| 2012/0297986 A1* | 11/2012 | Suda | B01D 19/0057 96/212 |
| 2014/0109769 A1* | 4/2014 | Tronik | B01D 19/0057 96/165 |
| 2016/0051994 A1* | 2/2016 | Toda | B04C 3/06 55/447 |

* cited by examiner

Introduce the process stream into a cyclonic separator via an inlet manifold

↓

Guide said process stream into at least one involute chamber in fluid communication with the inlet manifold

↓

Allow processes stream to swirl around an involute inlet of said at least one involute chamber axis and then into at least one cyclonic chamber in the form of a cylindrical tube, said cyclonic chamber being adjacent and contiguous to a lower end of the involute chamber, to separate the heavy phase from the light phase

↓

Allow the heavy phase to exit via a lower outlet in each of the at least one cyclonic chambers tubes

↓

Allow the light phase to rise through a central axis of the cyclonic chamber and the involute chamber and exit via a gas outlet on a top of the involute chamber, wherein the involute chamber in part extends beyond the outlet tube to define the involute inlet such that the involute inlet of the involute chamber is laterally separated from the gas outlet.

FIGURE 8

CYCLONIC SEPARATOR SYSTEM

FIELD

The present disclosure relates to systems and methods for separating an entrained immiscible phase from another phase in a multiple phase stream.

BACKGROUND

The subject of the present disclosure relates generally to gas/liquid separators or gas/liquid/solid separators. Separators of this type are typically vessels that may be operated at atmospheric or above atmospheric pressures.

The main function of a cyclonic separator system is to segregate immiscible phases of a process stream, such as when a process stream comprises a mixed liquid phase and gas phase. Such separator systems utilize cyclonic chambers installed inside a pressure vessel. An inlet and a manifold chamber leads from the outside of the pressure vessel to the entrance to each of the cyclonic chambers. A typical cyclonic separator may employ one or more cyclonic chambers, depending on the application and the capacity required, as illustrated in FIG. 7.

Separator systems are commonly used in the oil and gas industry to, for example, separate immiscible entrained gases from a liquid phase of a mixed gas/liquid process stream, wherein the process stream enters the pressure vessel through an inlet manifold chamber, and from there enters the individual cyclonic chambers through inlets that are tangential to the curvature of each of the cyclonic chambers. As a result of the velocity and the tangential angle at which the liquid/gas process stream enters the cyclonic chamber, centrifugal forces act on the process stream and cause it to spin around the curvature of the cyclonic chamber.

Centrifugal forces acting on each of the immiscible phases in the process stream, cause the phases to move either away from or towards the centre of the cyclonic chamber. A difference in the mass and densities of phases of the process stream cause the heavier phases (such as the one or more liquids of the liquid phase) to coalesce on the inner wall of the cyclonic chamber and travel in a downwards direction through the cyclonic chamber due to the force of gravity, while the lighter, or gaseous, phase(s) of the gas phase tend to remain closer to the centre of the cyclonic chamber forming a central upward moving column of lighter phase that exit through an aperture positioned in the upper covering of the cyclonic chamber.

To ensure effective light/heavy phase separation, the incoming process stream needs to flow at a higher velocity to create a greater centrifugal force for separation of the heavier phase from the lighter phase. As well, the gas outlet aperture must be designed to a minimum size based on how much lighter phase is being separated out. There are further limits to the design of the tangential inlets to each of the cyclonic chambers to create the desired high momentum and flow rate of the incoming process fluid. When this high momentum incoming processes stream enters the cyclonic chamber, there tends to be a pressure drop and corresponding fluid expansion of the process stream.

When the inlet process stream expands upon entry, it is limited in expanding outwardly by the sidewalls of the cyclonic chamber cylindrical tube, so there is a tendency for the process stream, containing both a heavy and light phase, to expand into the central upward moving column of light phase, thereby undesirably resulting in at least some entrainment of liquid phase(s) in the exiting gaseous phase(s).

Furthermore, with high flow rate and velocity of the process stream entering the cyclonic chamber tubes, often the momentum of the fluid is greater than the force of gravity acting on the heavier liquid phase being separated, preventing some of the heavier, liquid phase from flowing down to the liquid outlet. This leads to heavier, liquid phase being present in the cyclonic chamber and a greater chance of the heavier phases crossing over into the central upward moving column of lighter, gas phase.

Typically to overcome this type of one must either operate the cyclonic separator at a lower flow rate, thus reducing the volume of a process stream that may be separated in a given timeframe, or design larger cyclonic chamber volume to meet capacity requirements for separating a liquid/gas process stream.

As illustrated in FIG. 7, a common design for a prior art cyclonic separator 100 is comprised of multiple cyclonic chambers 104 in fluid communication with an inlet manifold 106 through a tangential inlet 102. A process stream enters the inlet manifold 106 through the entrance 108 and travels in direction A through the inlet manifold 106. As the process stream travels through the inlet manifold 106, portions of the process stream are forced through the tangential inlet 102 of each of the eight cyclonic chambers 104, wherein the momentum and flowrate of the flowing portion of the process stream, upon impact against the inner surface 110 of the cyclonic chamber 104 causes the process stream to splash through the gas outlet of the cyclonic chamber 104. This results in a failure mode of the cyclonic separator 100 as the lighter, or gaseous, phases of the process stream exiting the cyclonic chamber 104 becomes contaminated with the heavier, or liquid, phases of the process stream, thereby reducing the efficiency of separation of the heavier and lighter phases of the process stream.

In the prior art, when this type of failure mode occurs, one must modify the operation of the cyclonic separator 100 such as reducing the flow rate of the incoming process stream or the flow rate of the exiting lighter, gaseous phases of the process stream, so as to reduce the flow rate or volume of process stream entering the tangential inlet 102 of the cyclonic chamber 104. As such, there is a need for an improved design of a cyclonic separator that will improve the efficiency and capacity for separation of a gas phase from a liquid phase in a mixed process stream.

SUMMARY OF THE INVENTION

A cyclonic separator is provided, comprising at least one cyclonic chamber in the form of a cylindrical tube, having an upper inlet end and a lower liquid outlet end, at least one involute chamber located adjacent to and in fluid communication with the upper end of each of the at least one cyclonic chambers. The involute chamber comprises an involute inlet and a gas outlet proximal an upper end of the involute chamber. An inlet manifold is in fluid communication with said at least one involute chamber via the involute inlet. Said involute inlet of said involute chamber is laterally separated from said gas outlet.

A method is provided for separation of a mixed heavy phase/light phase process stream. The method comprises the steps of introducing the process stream into a cyclonic separator via an inlet manifold guiding said process stream into at least one involute chamber in fluid communication with the inlet manifold allowing processes stream to swirl around an involute inlet of said at least one involute chamber axis and then into at least one cyclonic chamber in the form of a cylindrical tube, said cyclonic chamber being adjacent and contiguous to a lower end of the involute chamber, to separate the heavy phase from the light phase allowing the heavy phase to exit via a lower outlet in each of the at least one cyclonic chambers tubes and allowing the light phase to rise through a central axis of the cyclonic chamber and the involute chamber and exit via a gas outlet on a top of the involute chamber. The involute inlet of the involute chamber is laterally separated from the central axis and from the gas outlet to reduce interference of the heavy phase in the exit of the light phase.

BRIEF DESCRIPTION OF THE DRAWINGS

FIG. 7 is a top plan view of a prior art cyclonic separator with eight cyclonic chambers and FIG. 8 is a schematic diagram of a method of the present invention.

DETAILED DESCRIPTION OF EMBODIMENTS OF THE INVENTION

The present disclosure relates to an improved cyclonic chamber for use in separating an immiscible gas phase from liquid phases of a mixed liquid/gas process stream, and more particularly, for a system and method for separating gas phases from liquid phases of a mixed liquid/gas process stream. While the process streams considered in the present context are a mixed stream of primarily liquids and gases, it is also possible for the present process streams to contain solid particulates as well. In such cases it would be understood by a person of skill in the art that such solid particulates would be separated from the gas phase and would exit the separator along with the heavier liquid phase through a lower end of the separator.

It is understood that the improved cyclonic separation device disclosed herein is not limited in its application to the details of the construction and arrangement of the parts illustrated in the accompanying drawings. The cyclonic separation device disclosed herein is capable of other embodiments and configurations and of being practiced or carried out in a variety of ways, and the terminology employed herein are for the purposes of description only and are not intended to be limiting in any way.

Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, phases, or steps may be present, or utilized, or combined with other elements, phases, or steps that are not expressly referenced.

Figure 1A:
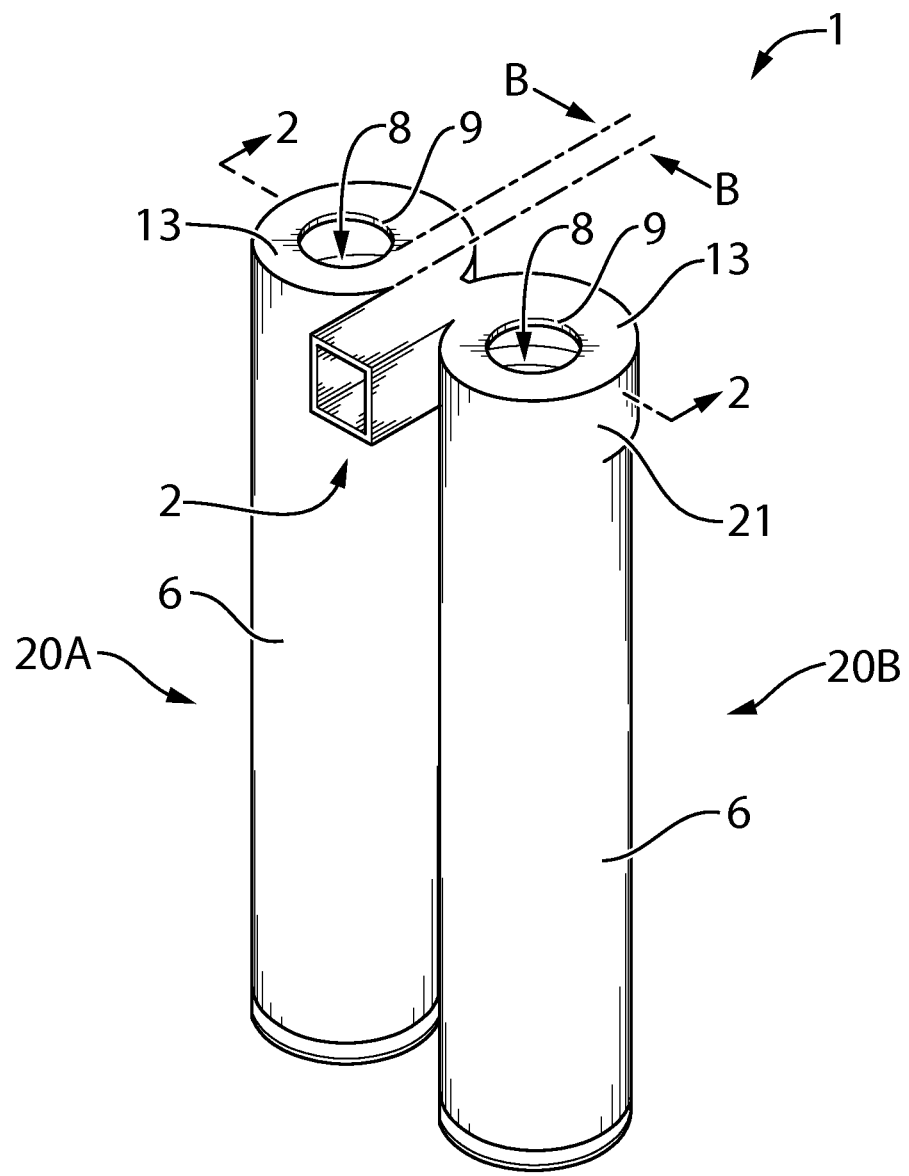
FIG. 1A is a top perspective view of an embodiment of the cyclonic separator with two cyclonic chambers.
Figure 1B:
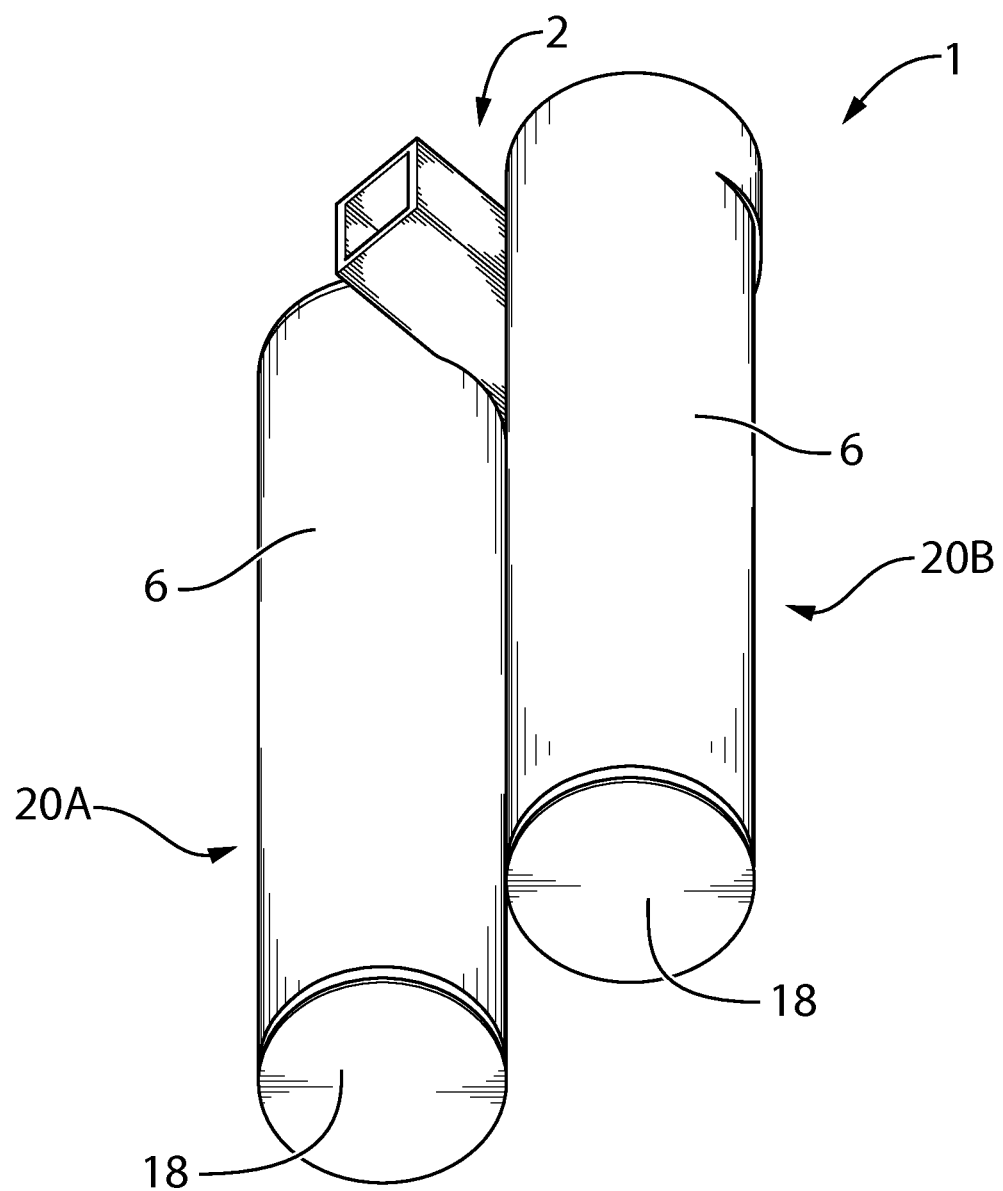
FIG. 1B is a bottom perspective view of the embodiment of the cyclonic separator shown in FIG. 1A.
Figure 5:
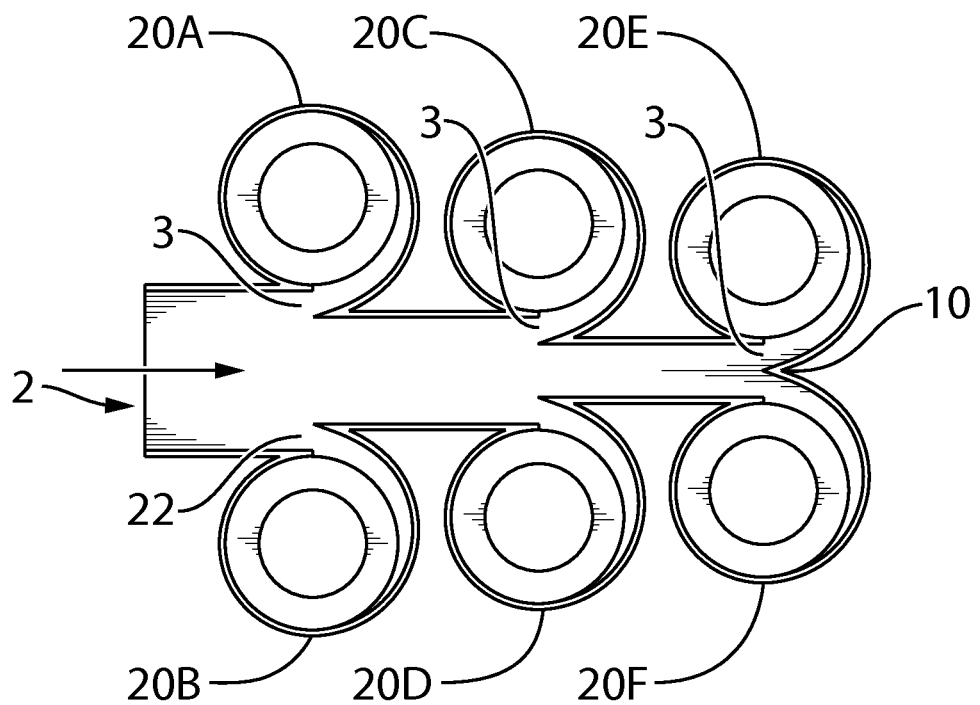
FIG. 5 is a top plan view of an embodiment of the cyclonic separator with six cyclonic chambers.
Figure 6:
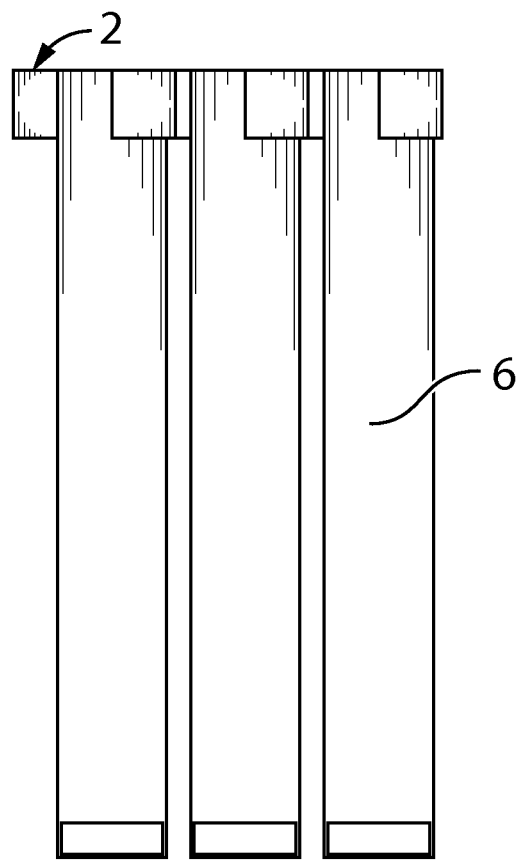
FIG. 6 is a side elevation view of the embodiment of the cyclonic separator shown in FIG. 5.
Figure 7:
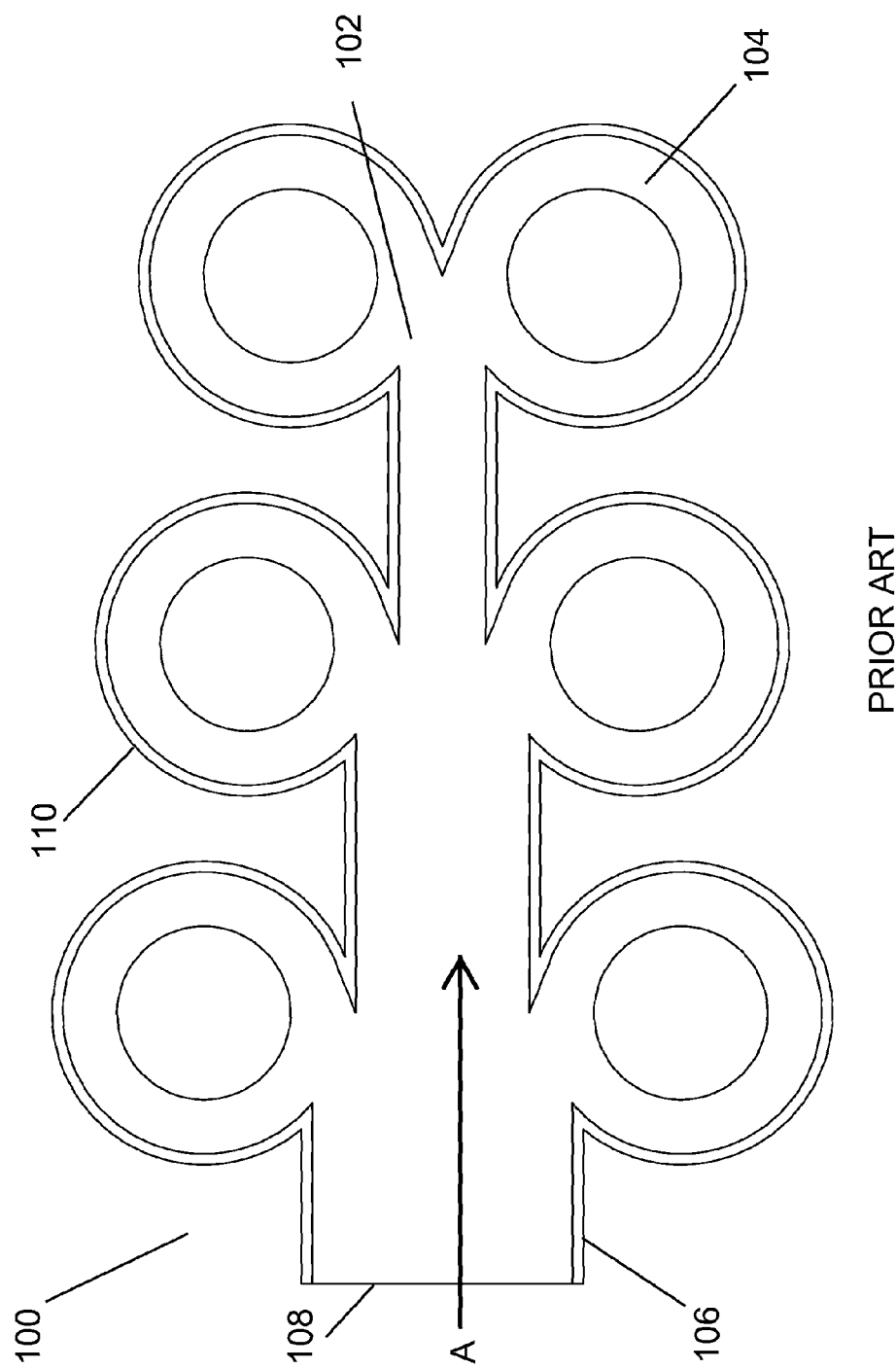

As illustrated in FIGS. 1A and 1B, an embodiment of the improved cyclonic separator 1 disclosed herein is comprised of an inlet manifold 2 and one or more cyclonic chambers 20 which are oriented substantially vertically. In general, the inlet manifold 2 may be in communication with one or more cyclonic chambers 20, and is preferably in communication with an even number of cyclonic chambers 20, such as for example the two cyclonic chambers 20A, 20B illustrated in FIGS. 1A and 1B, or the six cyclonic chambers 20A, 20B, 20C, 20D, 20E and 20F illustrated in FIGS. 5 and 6, wherein the even number of cyclonic chambers 20 are arranged in pairs along opposing sides of the inlet manifold 2.

Figure 2:
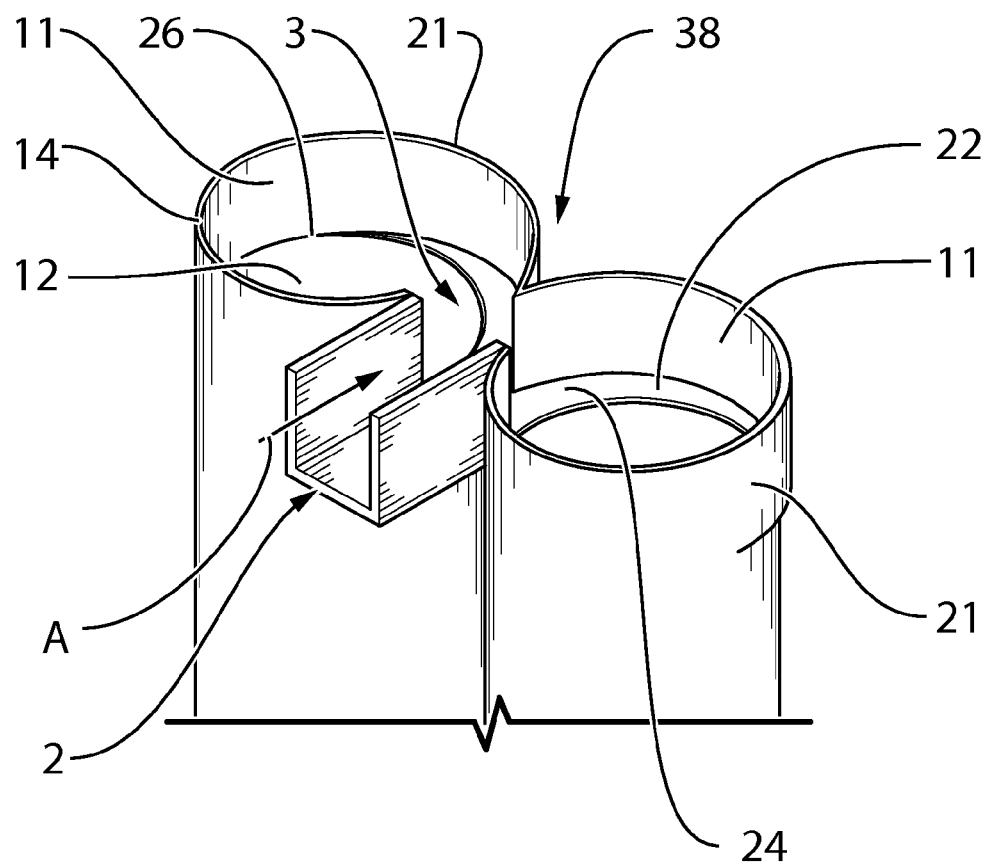
FIG. 2 is a cross-sectional top perspective view of the embodiment of the cyclonic separator shown in FIG. 1A, taken along line 2-2 of FIG. 1A and showing a fragmentary view of the upper portion of the pair of cyclonic chambers.

In an embodiment of the cyclonic separator 1 disclosed herein and illustrated in FIGS. 1A, 1B and 2, the cyclonic chambers 20A and 20B are each comprised of a involute chamber 21, an outlet tube 6 and a bottom surface 18. The involute chamber 21 is preferably arranged proximal an upper end of the outlet tube 6 and is in fluid communication with the outlet tube 6. The outlet tube 6, which is hollow, is preferably cylindrical in geometry, as a cylindrical geometry is generally easier and less expensive to manufacture, and is just as efficient or more efficient at separating an inlet stream comprised of immiscible gas and liquid phase as other possible geometries for an outlet tube 6, such as a conical or a frusto-conical geometry.

The inlet manifold 2 is also hollow and in fluid communication with each of the involute chambers 21 and cyclonic chambers 20, and preferably the inlet manifold 2 has a square or rectangular geometry, wherein the entrance of the inlet manifold 2, which is a front elevation cross-section of the inlet manifold 2, is preferably a square or a rectangle. While FIGS. 1A, 1B and 2 illustrate the inlet manifold 2 as being at a right angle to the length of the cylindrical cyclonic chambers 20A and 20B, it is also possible for the inlet manifold 2 to slope downwards at an angle greater than 90 degrees to the length of the cylindrical cyclonic chambers 20A and 20B, thus enhancing the gravity pull on the heavier liquid phase of the mixed process stream as it enters the separator.

The process stream enters the cyclonic chamber and generally divides into portions that enter each of the involute chambers 14. In a more preferred embodiment, a deflector 10 may be inserted between the rear portions 38, 38 of each of the involute chambers 21, 21 of the cyclonic chambers 20A, 20B illustrated in FIGS. 1A and 2, however it would be understood by a person of skill in the art that such deflector is optional and other means of dividing the process stream into each of the cyclonic chambers would be understood by a person of skill in the art and is covered by the scope of the present invention.

Figure 3:
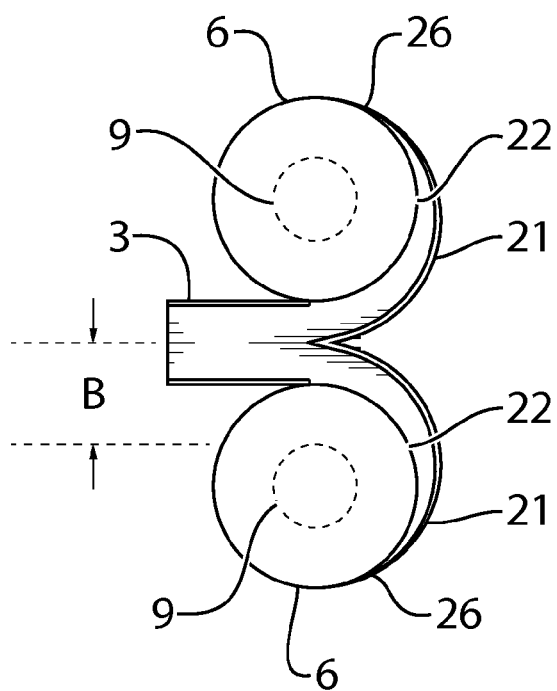
FIG. 3 is a top plan view of the embodiment of the cyclonic separator shown in FIG. 1A
Figure 4:
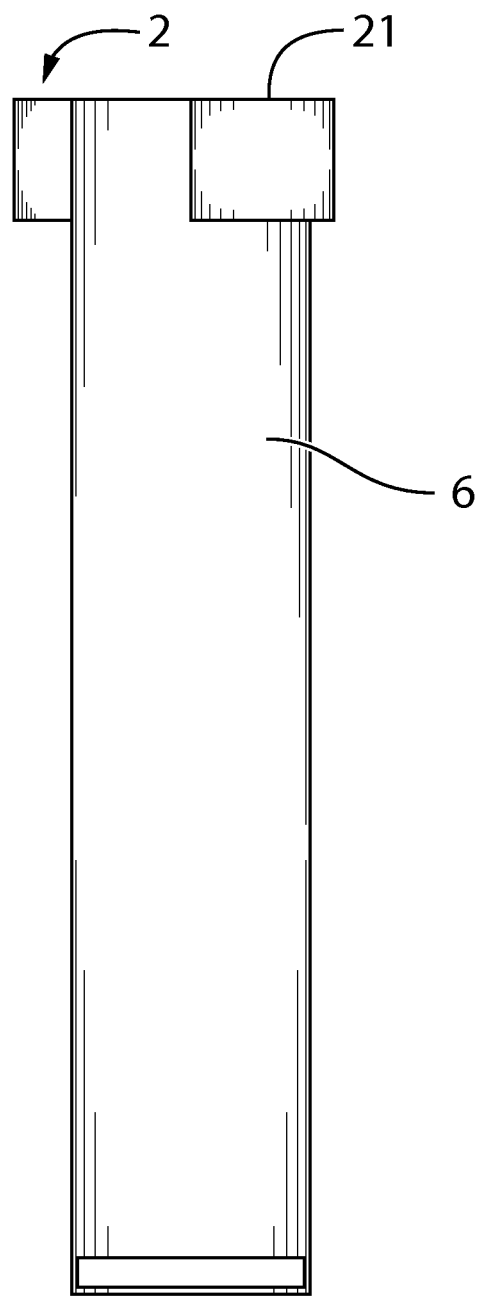
FIG. 4 is a side elevation view of a further embodiment of the present cyclonic separator.

As seen in FIG. 3, the involute chamber 21, arranged at the upper portion of the outlet tube 6 and in fluid communication with the outlet tube 6 and the inlet manifold 2, is comprised of an involute shaped body 14, such that the curved surface of the involute chamber body 14 is in part aligned with the curved surface of the cylindrical outlet tube 6, and in part extends beyond the outlet tube 6, defining an involute inlet 3 that is in fluid communication with the inlet manifold 2, and a ledge 22 that connects the involute chamber body 14 to the outlet tube 6 where the involute chamber body extends beyond the outlet tube. The involute chamber 21 acts as a pre-chamber area to increase the gas handling volume of an upper section of the cyclonic separator 1.

The involute inlet 3 allows an incoming process stream to flow from the inlet manifold 2 into each of the involute chambers 21, 21 of each of the cyclonic chambers 20A, 20B. The ledge 22 may be positioned at a substantially right angle to the involute shaped chamber body 14 of the involute chamber 21 and the outlet tube 6. Alternatively, in another embodiment of the improved cyclonic separator 1 disclosed herein, the plane of the ledge 22 may slope or thread in a downwards direction from the involute inlet 3 to its end point 26, wherein the angle of slope may be any angle less than 45° and more preferably between 20° and 30°.

The ledge 22 is widest contiguous to the involute inlet 3 and narrows as it extends from the involute inlet 3 and around the curvature of the wall of the involute chamber 21 to where curved surface of the cylindrical involute chamber body 14 is aligned with the curved surface of the cylindrical outlet tube 6.

A cover 13 covers each involute chamber 21 and is sized so as to cover the entire area of the substantially cylindrically shaped involute chamber 21 and is contiguous with an upper surface of the inlet manifold 2. Furthermore, each cover 13 comprises a gas outlet 8 formed by an aperture 9.

With reference to FIG. 2, a process stream comprised of one or more immiscible gases entrained in one or more liquids enters the cyclonic separator 1 through the inlet manifold 2, and then the total volume of the process stream is substantially equally distributed between each of the involute chambers 21, 21 of each of the cyclonic chambers 20A, 20B. In a preferred embodiment, the substantially equal distribution of the total volume of the process stream is facilitated by the deflector 10, towards each of the involute chambers 21, 21 of cyclonic chambers 20A, 20B.

With reference to FIG. 8, substantially equal portions of the process stream enter the involute chambers 21, 21 of the cyclonic chambers 20A, 20B through the involute inlets 3, 3. Upon entry to the involute chambers 21, 21, in each of the involute chambers 21, 21 the portions of the process stream travel along the diminishing ledge 22 from the wide end 24 of ledge 22 towards the narrow end 26 of ledge 22 and along the inner surface 11 of the involute chamber 21. As the portions of the travel stream reach the end 26 of ledge 22, the heavier, or liquid, phases of the process stream is forced against, and continues along, the inner surface 11 of involute chamber 21 by means of centrifugal force caused by the acceleration of the heavier, or liquid, phases of the process stream around the circumference of the inner surface 11, while simultaneously being pulled downwards by the force of gravity, which causes the heavier, or liquid, phases of the process stream to travel along the inner surface 12 of the cylindrical outlet tube 6 in a downward helical path. Preferably, the heavy, liquid phase exits a lower end of the cyclonic chamber via an outlet restriction on the lower end of the cyclonic chambers 20A, 20BB, said outlet restriction (not shown) comprising a flat plate with an annular opening or core axial restriction. Alternately, the cyclonic chambers 20A, 20B may be designed with additional length and no outlet restriction, thus metering the ingress to the tubes of heavy separator fluids;

At the same time, the lighter, or gaseous, phases of the process stream, due to their lower masses and densities, collect in substantially the centre portion, or vertical axial core of the cyclonic chambers 20, forming a central, upward moving column of lighter, or gaseous, phases that exit the cyclonic chamber 20 through the gas outlet 8 of the involute chambers 21.

Advantageously, in the design of the improved cyclonic separator disclosed herein, as illustrated in FIGS. 1B and 2, the inclusion of the involute chamber allows for additional volume and capacity of the process stream entering the cyclonic chamber 20a and 20b.

A film of the heavier, or liquid, phase accumulates onto and flows off of the ledge in a downwards, helical direction along the inner surface 12 of the cylindrical outlet tube 6. In a preferred embodiment of the cyclonic separator 1, the ledge 22 slopes downward to enhance the downward travel of the film of heavier, liquid phase of the process stream.

Furthermore, the cyclonic separator disclosed herein presents an increased lateral separation B, illustrated in FIGS. 1A and 3, between the involute inlet 3 and the aperture 9 of the gas outlet 8. The increased lateral separation B is the result of the expanding shape of involute chamber 21, and it allows for a larger capacity of process stream to enter the separator and be accommodated without interfering with the aperture 9 of the gas outlet 8. The combination of the use of a involute inlet 3 leading to each of the cyclonic chambers 20 to provide a larger capacity, and the increased lateral separation B between the edge of the gas outlet 8 and the involute inlet 3 serves to reduce the interference of droplets of the heavier, or liquid phase of the process stream into the gas outlet 8 passage at the centre of the cyclone separator, thereby improving the efficiency of separation of the liquid and gas phases without having to reduce the flow rate of the incoming process stream or reduce the gas capacity of the cyclonic separator 1.

As will be apparent to those skilled in the and the introduction of the diminishing ledge 22 at the involute inlet 3 so as to increase the flow of the liquid phase accumulating on the ledge 22 and the inner surface 11 of the involute chamber art in the light of the foregoing disclosure, many alterations and modifications are possible in the practice of this invention without departing from the spirit or scope thereof. Accordingly, the scope of the invention is to be construed in accordance with the substance defined by the following claims.

What is claimed is:

1. A cyclonic separator, comprising:
   a. at least one cyclonic chamber in the form of a cylindrical tube, having an upper inlet end and a lower liquid outlet end;
   b. at least one involute chamber located adjacent to and in fluid communication with the upper end of each of the at least one cyclonic chambers, comprising:
      i. an involute inlet; and
      ii. a gas outlet tube proximal an upper end of the involute chamber; and
   c. an inlet manifold in fluid communication with said at least one involute chamber via the involute inlet,
wherein said involute chamber in part extends beyond the gas outlet tube to define the involute inlet such that the involute inlet of said involute chamber is laterally separated from said gas outlet tube.

2. The cyclonic separator of claim 1, wherein the inlet manifolds is in fluid communication with one or more involute chambers, and each involute chamber is in fluid communication with a cyclonic chamber.

3. The cyclonic separator of claim 1, further comprising a ledge connecting the involute chamber to cyclonic chamber and forming a lower surface of the involute inlet.

4. The cyclonic separator of claim 3, wherein the ledge is sloped downwardly from the inlet manifold to an end point of the ledge.

5. The cyclonic separator of claim 4, wherein the angle of the slope of the ledge is less than 45°.

6. The cyclonic separator of claim 1, wherein inlet manifold is at a right angle to a length of the at least one cylindrical cyclonic chamber.

7. The cyclonic separator of claim 1, wherein the inlet manifold slopes downwards into the involute chamber.

8. The cyclonic separator of claim 1, wherein the liquid outlet comprises a restriction in the form of a flat plate with annular opening.

9. The cyclonic separator of claim 1, wherein the inlet manifold is of a cross sectional shape selected from the group consisting of round, oval, square and rectangular.

10. The cyclonic separator of claim 1, further comprising a deflector located between two cyclonic chambers to divide a process stream approximately equally between the two cyclonic chambers.

11. A method for separation of a mixed heavy phase/light phase process stream, said method comprising the steps of:
 a. introducing the process stream into a cyclonic separator via an inlet manifold;
 b. guiding said process stream into at least one involute chamber in fluid communication with the inlet manifold;
 c. allowing processes stream to swirl around an involute inlet of said at least one involute chamber axis and then into at least one cyclonic chamber in the form of a cylindrical tube, said cyclonic chamber being adjacent and contiguous to a lower end of the involute chamber, to separate the heavy phase from the light phase;
 d. allowing the heavy phase to exit via a lower outlet in each of the at least one cyclonic chambers tubes; and
 e. allowing the light phase to rise through a central axis of the cyclonic chamber and the involute chamber and exit via a gas outlet tube on a top of the involute chamber, wherein the involute chamber in part extends beyond the gas outlet tube to define the involute inlet such that the involute inlet of the involute chamber is laterally separated from the gas outlet tube.

12. The method of claim 11, wherein the process stream is guided into one or more involute chambers, and each involute chamber is in fluid communication with a cyclonic chamber.

13. The method of claim 11, further comprising guiding said process stream into at least one involute chamber via a ledge connecting the involute chamber to cyclonic chamber.

14. The method of claim 13, wherein the ledge is sloped downwardly from the inlet manifold to an end point of the ledge.

15. The method of claim 14, wherein the angle of the slope of the ledge is less than 45°.

16. The method of claim 11, wherein inlet manifold is at a right angle to a length of the at least one cylindrical cyclonic chamber.

17. The method of claim 11, wherein the inlet manifold slopes downwards into the involute chamber.

18. The method of claim 11, wherein the liquid outlet comprises a restriction in the form of a flat plate with annular opening.

19. The method of claim 11, wherein the inlet manifold is of a cross sectional shape selected from the group consisting of round, oval, square and rectangular.

20. The method of claim 11, wherein guiding said process stream into at least one involute chamber in fluid communication with the inlet manifold comprises flowing said process stream across a deflector located between two cyclonic chambers to divide a process stream approximately equally between the two cyclonic chambers.

* * * * *